(12) United States Patent
Toba

(10) Patent No.: US 7,321,390 B2
(45) Date of Patent: Jan. 22, 2008

(54) RECORDING MEDIUM MANAGEMENT DEVICE AND DIGITAL CAMERA INCORPORATING SAME

(75) Inventor: Akira Toba, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 865 days.

(21) Appl. No.: 10/642,639

(22) Filed: Aug. 19, 2003

(65) Prior Publication Data

US 2004/0036780 A1    Feb. 26, 2004

(30) Foreign Application Priority Data

Aug. 20, 2002   (JP)   ............... 2002-238790

(51) Int. Cl.
*H04N 5/76*   (2006.01)
(52) U.S. Cl. ............... 348/231.2; 348/231.7; 348/231.1; 711/173
(58) Field of Classification Search ........ 348/231.99, 348/231.2, 333.01, 333.02, 231.8, 231.7; 711/173
See application file for complete search history.

(56) References Cited

U.S. PATENT DOCUMENTS

| | | | | |
|---|---|---|---|---|
| 5,226,145 A | * | 7/1993 | Moronaga et al. | 711/202 |
| 5,576,758 A | * | 11/1996 | Arai et al. | 348/220.1 |
| 5,699,549 A | * | 12/1997 | Cho | 711/115 |
| 6,330,653 B1 | * | 12/2001 | Murray et al. | 711/173 |
| 6,347,184 B2 | * | 2/2002 | Yamagishi | 386/95 |
| 6,467,016 B1 | * | 10/2002 | Kanai | 711/103 |
| 6,661,454 B1 | * | 12/2003 | Hwang et al. | 348/231.1 |
| 6,674,472 B1 | * | 1/2004 | Tsutsui | 348/333.05 |
| 6,785,745 B2 | * | 8/2004 | Isshiki et al. | 710/5 |
| 6,810,441 B1 | * | 10/2004 | Habuto et al. | 710/20 |
| 6,992,711 B2 | * | 1/2006 | Kubo | 348/231.7 |
| 7,088,858 B2 | * | 8/2006 | Henry | 382/173 |
| 7,117,453 B2 | * | 10/2006 | Drucker et al. | 715/833 |

FOREIGN PATENT DOCUMENTS

| | | |
|---|---|---|
| JP | 4-137882 | 5/1992 |
| JP | 2001-346075 | 12/2001 |
| JP | 2002-041336 | 2/2002 |

* cited by examiner

*Primary Examiner*—David Ometz
*Assistant Examiner*—Pritham D. Prabhakher
(74) *Attorney, Agent, or Firm*—Kratz, Quintos & Hanson, LLP

(57) ABSTRACT

A digital camera showing on a display a graphical user interface having a first display portion for inputting priority ratio of high speed in access to an external memory card to recordable capacity in formatting the external memory card, a second display portion for showing a cluster size, and a third display portion for showing the number of images recordable to the external memory card. The recording medium is formatted with the cluster size shown on the second display portion in response to the user's manipulation.

3 Claims, 5 Drawing Sheets

HIGH-SPEED/CAPACITY MENU

PRIORITY TO HIGH-SPEED/CAPACITY?
MOVE CURSOR TO PRIORITY SIDE (b)   HIGH-SPEED <☐☐■☐☐> CAPACITY    DERTERMINE

PRESENT FORMAT SPEED RATIO: ABOUT ×1
USED CAPA. UNIT: 8 [SECTOR/CLUSTER]
NUMBER OF IMAGES TAKEN: 100

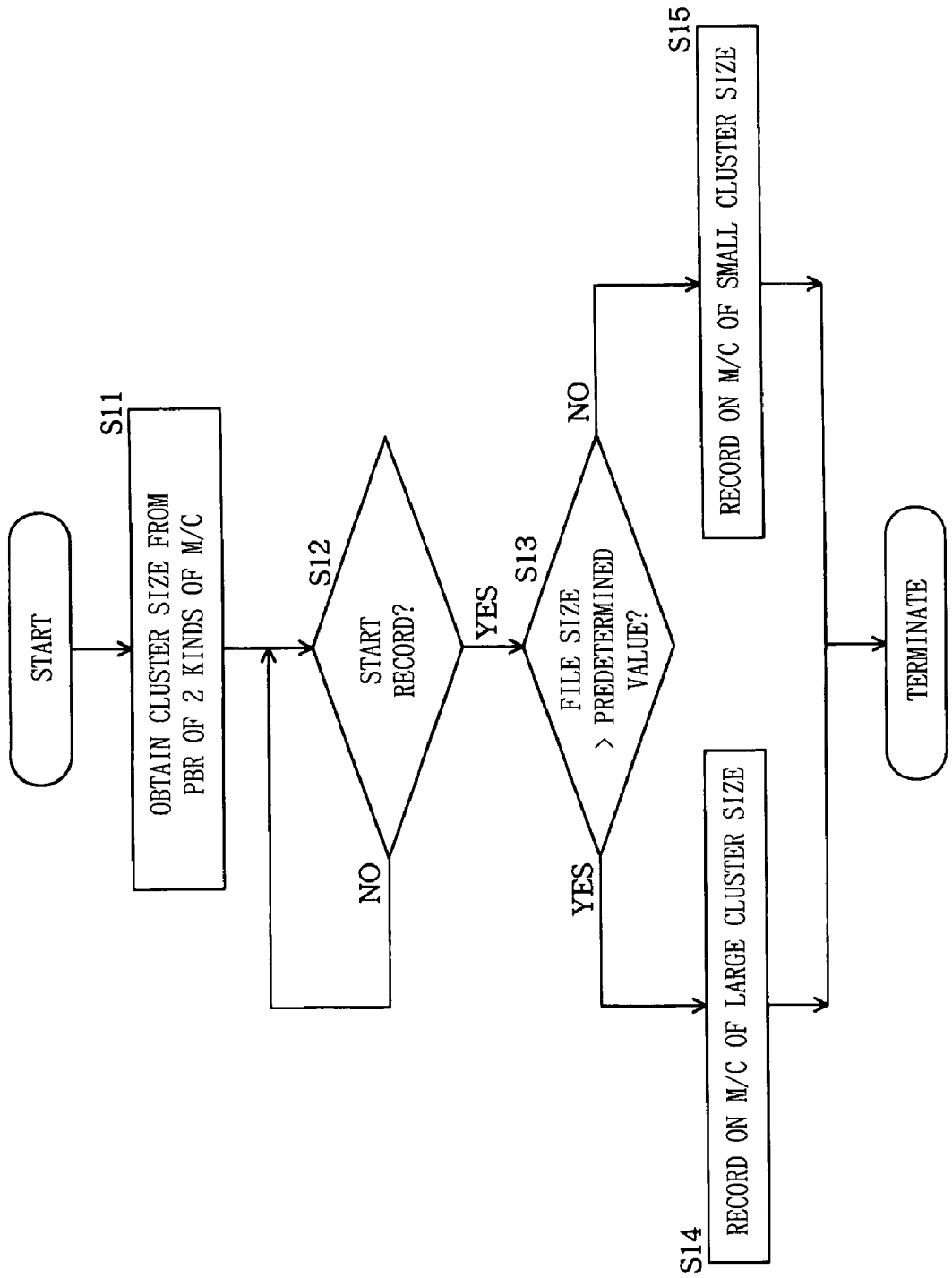

FIG. 6 (a)

| MENU SCREEN |
|---|
| VOICE REPRODUCTION |
| AUTOMATIC TURNABLE REPRODUCTION SETTING |
| DATE, TIME |
| BEEP SOUND |
| CELL DISCHARGE |
| LANGUAGE SELECTION |
| TV SYSTEM |
| [REFORMAT] |

FIG. 6 (b)

| HIGH-SPEED/CAPACITY MENU |
|---|
| PRIORITY TO HIGH-SPEED/CAPACITY?<br>MOVE CURSOR TO PRIORITY SIDE<br><br>HIGH-SPEED < □□■□□ > CAPACITY   DERTERMINE  — A<br><br>PRESENT FORMAT SPEED RATIO: ABOUT ×1<br>USED CAPA. UNIT: 8 [SECTOR/CLUSTER] — B<br>NUMBER OF IMAGES TAKEN: 100 — C |

FIG. 6 (c)

| FORMAT CONFIRM. MENU |
|---|
| FOLLOWING FORMAT OK?<br><br>HIGH-SPEED < ■□□□□ > CAPACITY   [DERTERMINE]  — A<br><br>PRESENT FORMAT SPEED RATIO: ABOUT ×2<br>USED CAPA. UNIT: 16 [SECTOR/CLUSTER] — B<br>NUMBER OF IMAGES TAKEN: 70 — C |

RECORDING MEDIUM MANAGEMENT DEVICE AND DIGITAL CAMERA INCORPORATING SAME

BACKGROUND OF THE INVENTION

1. Field of the Invention

The present invention relates to recording medium management devices for managing a recording medium with cluster units, each of which comprises a plurality of sectors, and digital cameras incorporating the recording medium management device.

2. Description of the Related Art

Generally, when data recording/playback devices such as digital cameras record image file data, etc. on recording media including memory cards, the number of sectors providing one cluster, i.e., cluster size is written in the region referred to as PBR (Partition Boot Record) of the recording medium, and the recording medium is managed with use of the two recording units of the cluster and the sector. The cluster size is set to the power of 2 of the number of sectors.

For the recording medium, the image file data and the like are arranged for the cluster units. Even though the data has 1 byte, one cluster is used for the record of the data. Accordingly, as the cluster size becomes larger, more space is wasted. However, as the cluster size becomes larger, one data file can be recorded with less number of clusters, whereby access speed becomes high.

Accordingly, the cluster size is approximately inversely proportional to the access speed. The larger cluster size makes it possible to realize high-speed access. This wastes, however, more space in recording a small sized file. Conversely, whereas the smaller cluster size decreases wasted space, the access speed is reduced.

However, with the recording/playback devices of portable type such as digital cameras, because the recording medium is formatted for a predetermined cluster size corresponding to the capacity of the recording medium, there arises the problem of not considering the user's request, in the case where the user gives greater priority to high speed in access than recordable capacity of the recording medium, or conversely the user gives greater priority to recordable capacity of the recording medium than high speed in access.

SUMMARY OF THE INVENTION

An object of the present invention is to provide a recording medium management device and digital camera wherein formatting can be performed in response to the request of the user, who gives priority to high speed in access to the recording medium, or to the recordable capacity of the medium.

The recording medium management device of the present invention comprises a graphical user interface displayer for displaying on a screen a graphical user interface having a first display portion for inputting priority ratio of high speed in access to the recording medium to recordable capacity of the recording medium in formatting the recording medium, a second display portion for displaying a cluster size representing the number of sectors providing one cluster, and a third display portion for displaying the number of data files recordable to the recording medium; a cluster size determiner/displayer for determining the cluster size in response to the user's inputting manipulation to the first display portion of the graphical user interface shown on the screen, and displaying the determined cluster size on the second display portion of the graphical user interface; a calculator/displayer for calculating the number of data files recordable to the recording medium in response to the determined cluster size, and displaying the calculated number of the files on the third display portion of the graphical user interface; and a formatter for formatting the recording medium with the cluster size displayed on the second display portion of the graphical user interface in response to the user's determining manipulation.

Furthermore, the digital camera embodying the present invention comprises the recording medium management device of the present invention and a display for showing various items of information.

With the recording medium and the digital camera of the present invention, the screen has shown thereon the graphical user interface in formatting the recording medium. The user manipulates the first display portion to input a desired priority ratio of high-speed in access to recordable capacity, determining the cluster size in response to the input ratio. As the high speed in access is given greater priority, the cluster size is set larger. As the recordable capacity of the medium is given greater priority, the cluster size is set smaller. The set cluster size is shown on the second display portion. Further the number of data files recordable to the recording medium is calculated based on the cluster size, having the calculated number of the files shown on the third display portion.

Accordingly, the user can confirm the cluster size and the number of the recordable data files obtained by the format of the recording medium by referring to the presentation of the graphical user interface. If the user is content with the cluster size and the number of the files presented, the user performs a determining manipulation. On the other hand, if the user is not content with the cluster size and the number of the files, the user reinputs the priority ratio of high-speed in access to recordable capacity to change the cluster size and the number of recordable files.

When the user performs the determining manipulation, the recording medium is formatted with the cluster size shown at the moment on the second display portion of the graphical user interface.

As described above, the recording medium management device of the present invention and digital camera incorporating same are adapted to perform formatting for satisfying the user's request in high-speed in access and recordable capacity of the recording medium.

BRIEF DESCRIPTION OF THE DRAWINGS

FIG. 5 is a flow chart showing data recording operation of the digital camera;

FIG. 6(a), (b), (c) are diagrams exemplifying graphical user interfaces shown on a display of the digital camera of the present invention, respectively.

DETAILED DESCRIPTION OF AN EXEMPLARY EMBODIMENT

Figure 1:
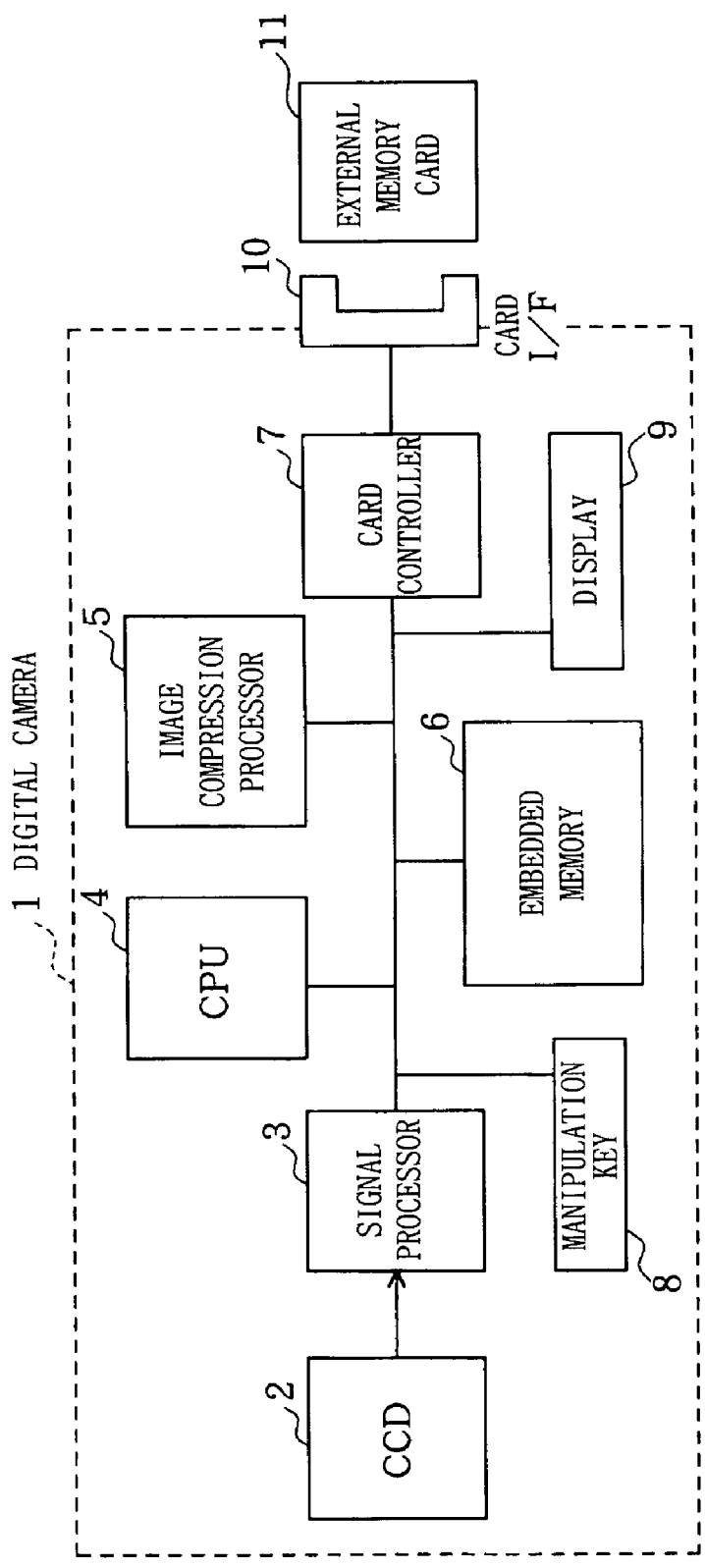
FIG. 1 is a block diagram showing a structure of a digital camera embodying the present invention.

An exemplary embodiment of the invention as applied to a digital camera will be described below in detail with reference to the drawings. As shown in FIG. 1, a digital camera 1 of the present invention comprises a CCD 2 for picking up images, a signal processor 3 for giving a predetermined signal processing to image data obtained by the CCD 2, a CPU 4, image compression processor 5 for compressing the image data, an embedded memory 6 for storing the compressed image data, a card controller 7, a manipulation key 8 for the user to manipulate, a display 9, and a card interface 10 into which an external memory card 11 may be inserted.

The external memory card 11 of the digital camera 1 is managed by the FAT file system. The external memory card 11 inserted into the card interface 10 is initialized (reformatted) for a predetermined format in accordance with the user's formatting manipulation.

In picking up an image, image data obtained from the CCD 2 is thereafter fed to the signal processor 3, the data is given a required signal processing, and is then compressed as image data for storage in the image compression processor 5. The image data for storage is written to the external memory card 11 with the external memory card 11 inserted into the card interface 10 under control of the card interface 10.

Figure 2:
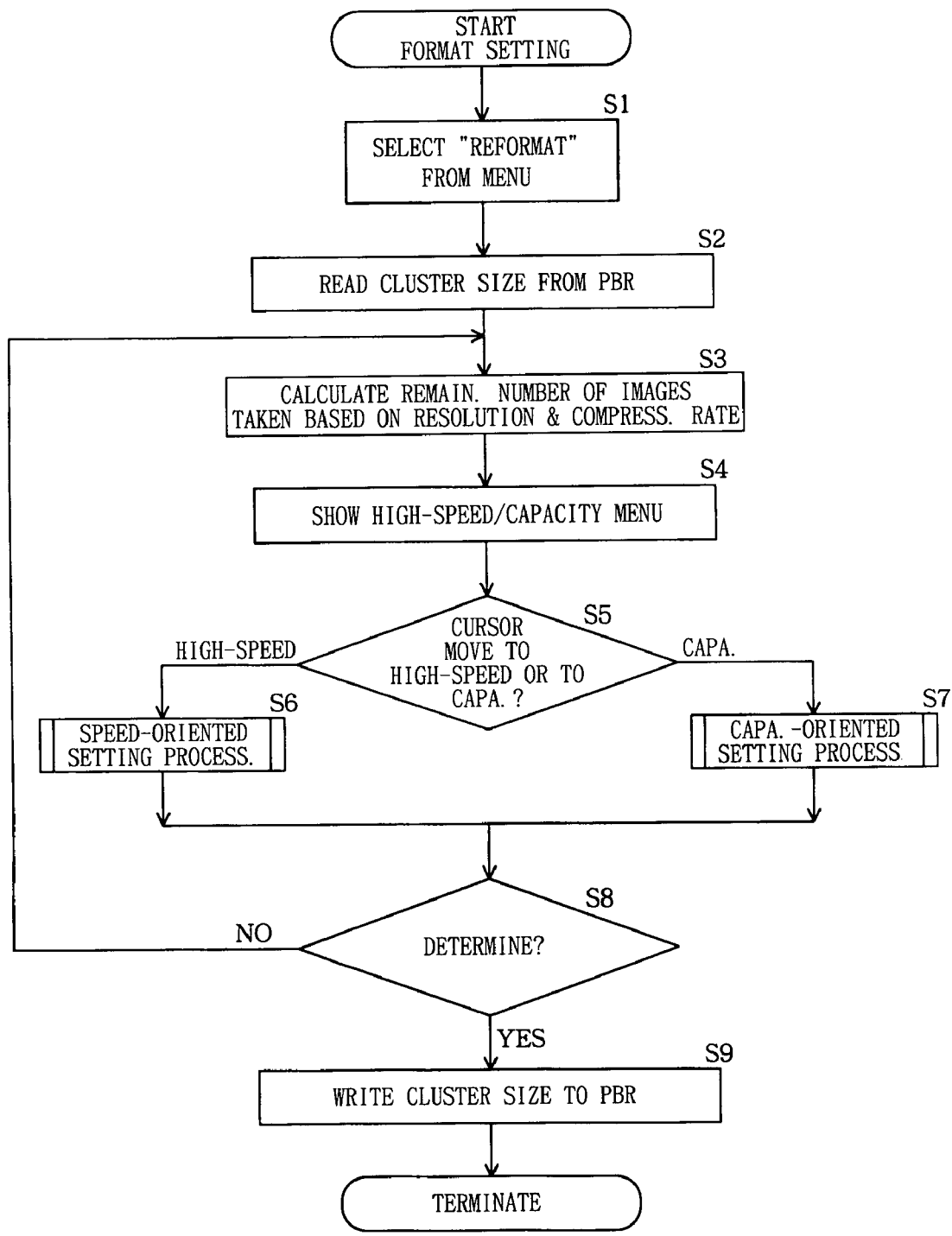
FIG. 2 is a flow chart showing a procedure for setting the format of an external memory card of the digital camera of the present invention.

FIG. 2 shows a procedure for setting a cluster size when the external memory card is formatted. First, in step S1 the display 9 has shown thereon a menu panel as shown in FIG. 6(*a*), to recognize selecting "reformat" of the menu panel. In step S2 the cluster size (initial value) is read out from PBR (Partition Boot Record) of the external memory card. Next, in step S3 the remaining capacity of the external memory card is calculated corresponding to the cluster size based on predetermined image resolution and compression rate, thereby calculating the number of pictures to be taken based on the remaining capacity.

The remaining capacity X of the external memory card is calculated from the following mathematical expression 1 wherein the total number of sectors of the partition in the FAT file system is TS, the number of sectors of each of the FAT is NF, the number of directory entries in the root directory is RD, and the number of sectors per cluster (cluster size) is SP.

$$X=(((((TS-(NF\times 2+RD\times 32\div 512))\div SP)\times SP\times 512))\div 512) \quad \text{(Mathematical Expression 1)}$$

For example, the number Y of pictures to be taken is calculated from the following mathematical expression 2 when the resolution is 1024×768 pixels, and the compression rate is 50%.

$$Y=((X\div SP)\times SP)\div(1024\times 768\times 0.5\div 512) \quad \text{(Mathematical Expression 2)}$$

Thereafter, in step S4 the display 9 shows thereon the high-speed/capacity selection menu as the user graphical interface as shown in FIG. 6(*b*). The menu includes a first display portion A for inputting priority ratio of high speed in access to the external memory card to recordable capacity by the movement of the cursor, a second display portion B for showing the cluster size (unit of used capacity), a third display portion C for showing the number of pictures to be taken.

Subsequently step S5 judges whether the cursor of the first display portion moves to the high-speed side or to the capacity side by the user's manipulation, as shown in FIG. 2. When the cursor moves to the high-speed side, step S6 follows to execute a speed-oriented setting procedure with the degree of the movement. When the cursor moves to the capacity side, step S7 follows to execute a capacity-oriented setting procedure with the degree of the movement.

Figure 3:
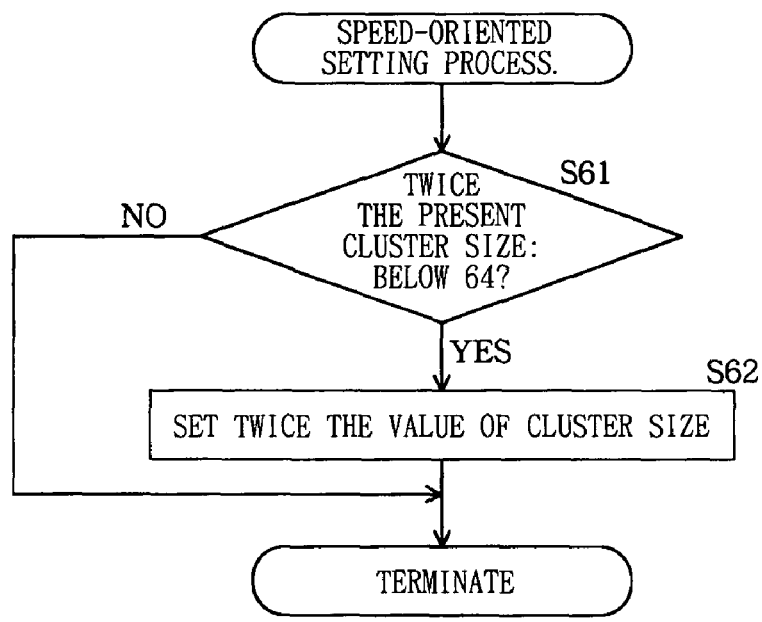
FIG. 3 is a flow chart showing a speed-oriented setting procedure.

As shown in FIG. 3, in the speed-oriented setting procedure an inquiry is made as to whether twice the value of the present cluster size is not greater than 64 in step S61. If the answer is affirmative, step S62 follows to set twice the value of the cluster size as a new cluster size.

Figure 4:
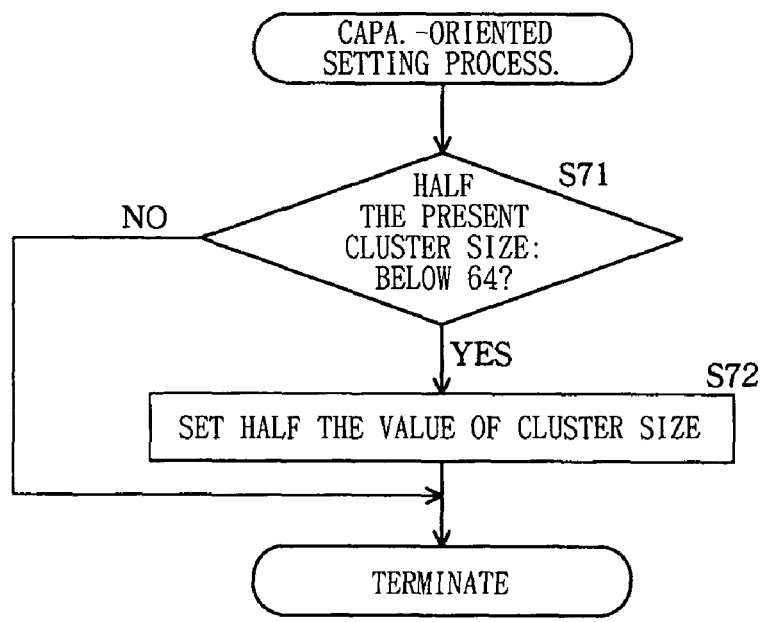
FIG. 4 is a flow chart showing a capacity-oriented setting procedure.

Furthermore, as shown in FIG. 4, in the capacity oriented setting procedure an inquiry is made as to whether half the value of the present cluster size is not greater than 64 in step S71. If the answer is affirmative, step S72 follows to set half the value of the cluster size as a new cluster size.

For example, when the cursor shown in FIG. 6(*b*) moves to the high-speed side as shown by the first display portion A in FIG. 6(*c*), the setting of the cluster size of the second display portion B is changed from 8[sector/cluster] to 16[sector/cluster]. As a result, reduced from 100 to 70 is the number of pictures to be taken shown in the third display portion C. This enables the user to recognize the increase of the cluster size in spite of the reduction of the number of pictures to be taken by giving priority to high speed in access.

Thereafter, step S8 shown in FIG. 2 inquires whether or not the user performs a determining manipulation in format confirmation menu shown in FIG. 6(*c*). When the answer is negative, the sequence returns to step S3 in FIG. 2 to recalculate and redisplay the cluster size and recalculate and redisplay the number of pictures to be taken in response to resetting the priority between high speed in access and recordable capacity by the user's cursor movement.

When it is judged that the user performs the determining manipulation in step S8, step S9 follows to write the cluster size shown on the second display portion to PBR of the external memory card, to thereby format the external memory card according to the written cluster size.

With the digital camera of the present invention described above, the user can confirm the cluster size and the number of pictures to be taken obtained by the format of the external memory card by referring to the presentation of high-speed/capacity selecting menu shown in FIG. 6(*b*). The formatting can be executed so as to satisfy the user's request in high-speed in access and the number of pictures to be taken by reinputting the priority between the high speed in access and the recordable capacity by the movement of the cursor, as shown in FIG. 6(*c*).

FIG. 5 shows the recording operation of a digital camera comprising two interfaces for connecting two kinds of external memory cards different in cluster size. First, in step S11, the two cluster sizes are obtained from the two kinds of external memory cards connected to the two interfaces, respectively. Then, in step S12 an inquiry is made as to whether the user manipulates the camera for starting recording. When the inquiry is answered in the affirmative, step S13 follows by inquiring whether the size of image file to be recorded is greater than a predetermined value.

When the inquiry is answered in the affirmative, step S14 follows to record the image file to the external memory card having a larger cluster size. When the inquiry is answered in the negative, step S15 follows to record the image file to the external memory card having a smaller cluster size.

With the digital camera described, one of the external memory cards is automatically selected according to the size of the image file to be recorded on the external memory card, and the image file having a larger size is recorded on the external memory card having a larger cluster size while the image file having a smaller size is recorded on the external memory card having a smaller cluster size, whereby the recording operation is realized so as to strike a balance between high-speed in access and recordable capacity.

Furthermore, with digital cameras, the most suitable cluster size may be determined based on a file size calculated from the resolution and compression rate of the image, and the external memory card can also be formatted for the determined cluster size. For example, it is possible that when the file size is not greater than 512 bytes, the cluster size is 1, or when the file size is not greater than 1,024 bytes, the cluster size is 2, and so on, or when the file size is not greater than 32,768 bytes, the cluster size is 64.

The digital cameras of the present invention are not limited to the foregoing embodiments in construction but can be modified variously by one skilled in the art without departing from the spirit of the invention as set forth in the appended claims.

What is claimed is:

1. A recording medium management device for managing a recording medium with cluster units each of which comprises a plurality of sectors, the recording medium management device comprising:

a graphical user interface displayer for displaying on a screen a graphical user interface having a first display portion for inputting priority ratio of high speed in access to the recording medium to recordable capacity of the recording medium in formatting the recording medium, a second display portion for displaying a cluster size representing the number of sectors providing one cluster, and a third display portion for displaying the number of data files recordable to the recording medium;

a cluster size determiner/displayer for determining the cluster size in response to the user's inputting manipulation to the first display portion of the graphical user interface shown on the screen, and displaying the determined cluster size on the second display portion of the graphical user interface;

a calculator/displayer for calculating the number of data files recordable to the recording medium in response to the determined cluster size, and displaying the calculated number of the files on the third display portion of the graphical user interface; and a formatter for formatting the recording medium with the cluster size displayed on the second display portion of the graphical user interface in response to the user's determining manipulation.

2. A digital camera comprising a recording medium management device for managing recording/playback of a recording medium with cluster units each of which comprises a plurality of sectors and a display for showing various items of information, the digital camera wherein the recording medium management device comprises:

a graphical user interface displayer for displaying on a display a graphical user interface having a first display portion for inputting priority ratio of high speed in access to the recording medium to recordable capacity of the recording medium in formatting the recording medium, a second display portion for displaying a cluster size representing the number of sectors providing one cluster, and a third display portion for displaying the number of images recordable to the recording medium;

a cluster size determiner/displayer for determining the cluster size in response to the user's inputting manipulation to the first display portion of the graphical user interface shown on the display, and displaying the determined cluster size on the second display portion of the graphical user interface;

a calculator/displayer for calculating the number of images recordable to the recording medium in response to the determined cluster size, and displaying the calculated number of the images on the third display portion of the graphical user interface; and a formatter for formatting the recording medium with the cluster size displayed on the second display portion of the graphical user interface in response to the user's determining manipulation.

3. A digital camera comprising a plurality of interfaces for connecting thereto a plurality of kinds of recording media different in cluster size representing the number of sectors providing one cluster, a file recording device for recording an image file on the recording medium with units of cluster, and a display for showing thereon various items of information, the digital camera wherein the file recording device comprises: a cluster size obtainer for obtaining the cluster size from the plurality of kinds of recording media connected to the plurality of interfaces; an interface selector for selecting one of the interfaces that is connected to one of the recording media that has a cluster size in accordance with the size of the image file to be recorded; and a file recorder for recording the image file on the recording medium connected to the selected interface.

* * * * *